Nov. 4, 1952

L. PAVELLE 2,616,331

PROJECTION PRINTER

Filed Sept. 6, 1945

INVENTOR
LEO PAVELLE
BY
John E. Hubbell
ATTORNEY

Nov. 4, 1952   L. PAVELLE   2,616,331
PROJECTION PRINTER
Filed Sept. 6, 1945   6 Sheets-Sheet 6

Fig. 12.

INVENTOR
LEO PAVELLE
BY John E. Hubbell
ATTORNEY

Patented Nov. 4, 1952

2,616,331

UNITED STATES PATENT OFFICE 2,616,331

PROJECTION PRINTER

Leo Pavelle, Mount Vernon, N. Y., assignor, by mesne assignments, to Pavelle Color Incorporated, New York, N. Y., a corporation of Delaware Application September 6, 1945, Serial No. 614,628

10 Claims. (Cl. 88—24)

The present invention comprises improvements in structure and mechanism primarily devised for use in an automatic optical projection printer for printing color pictures on successive sections of a flexible strip of suitably sensitized material by light projected through or reflected by a natural color picture. The latter may be a transparent negative or positive or other transparency having a color image through which light is transmitted to the sensitized material, or reproduction may be effected by reflecting light from the picture to the sensitized material and in such case the picture reproduced may be either opaque or transparent. Although primarily devised for use in printing color pictures as stated, my printer improvements may also be used in printing black and white pictures.

A primary object of the present invention is to provide an automatic optical projection printer adapted for daylight operation in printing pictures on a commercial scale, and including provisions for the insertion of unexposed sensitized material in a light proof printing material chamber of the printer and the removal of said material after exposure, but prior to its development, without requiring the use of a dark room.

In the preferred form of the invention the sensitized material is inserted in the printer in the form of a strip unit wound upon a flanged feed spool and comprising blind or opaque leader and trailer end portions and a sensitized body portion. Ordinarily the unit strip is of sufficient length for the printing thereon of a commercially desirable multiplicity of pictures, for example, five hundred to a thousand successive longitudinal strip sections about three inches long. In operation, the sensitized material strip is intermittently drawn off the feed roll and advanced through a printing position in which pictures are successively printed on sections of the strip successively advanced into said position. The strip material moving away from the printing position is wound up on a take-off flanged spool. After all of the strip material unit is wound on the take-up spool so that its sensitized body portion is covered by the opaque trailer end portion of the unit, the take-up spool may be removed and replaced by an empty take-up spool on which may be wound strip material drawn from another feed spool inserted in the printer and replacing the first mentioned feed spool.

More specific objects of the invention are to provide improved strip feeding or transmitting mechanism in the printing material chamber of the printer for intermittently advancing the sensitized strip so that pictures are printed on strip sections of the precise length desired under the prevailing condition of operation and to adapt said mechanism for use in advancing sensitized material strips of different widths, and for varying the extent of each feeding movement so as to vary the length of the strip section on which each picture is formed. Such variations in strip film width and section length are practically essential to a desirable range of variation in the size of the pictures printed.

A further object of the invention is to provide an optical projection printer with interchangeable projector sections each of which may be adapted for use in printing pictures of a size different from those printed with each of the others, or, in some cases, one or more of said projector sections may be adapted to project light through a transparent picture onto the printing material, and one or more projector sections may be adapted to transmit to the printing material light reflected from a picture which may be opaque.

A further object of the invention is to provide strip-feeding or transmitting mechanism which includes a readily replaceable measuring roll over which the strip material is moved without slippage and the circumferential extent of which determines the length of each of the strip sections on which pictures are successively printed. The ready replacement of the measuring roll is desirable to permit a worn roll to be replaced by an unworn roll whenever necessary, and also to permit of a variation in the size of the pictures printed as may be desirable from time to time.

A further object of the invention is to provide an automatic optical projection printer with easily actuated mechanism whereby the operator may set the printer into operation to make a single print, or a selected plurality of prints in rapid succession, from each picture reproduced in the printer, and with the exposure period in making each print determined automatically by electronic means responsive to the light transmitting or light reflecting capacity of the picture reproduced.

A further object of the invention is to provide an optical projection printer with improved means for laterally diverting from the optical axis of the printer a portion of the light projected through or reflected from the picture reproduced. Light thus diverted may be used in one or more auxiliary printer elements. In particular such light may be transmitted to one or more light sensitive elements which may be employed for automatic printer control purposes, and to a viewing lens through which the operator may observe an image of the picture inserted in the printer for reproduction.

Further objects of the invention are to provide a printer of the type specified with simple and effective means for photographically printing on each section of the sensitized material strip a number or symbol identifying the picture printed on said section, and to so locate said number or symbol as to facilitate its use in the electronic control of automatic mechanism for severing the strip sections on which the different pictures are printed.

A further object of the invention is to provide an automatic optical projection printer including a plurality of elements operating during time periods which are definitely related but are not simultaneous, with electromagnetic control device elements adapted to be associated in a control system through which the various printer operations are effected in proper sequence, and may be controlled by the actuation of a few push buttons or other simple manually operated control elements.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Figures 1, 1A:
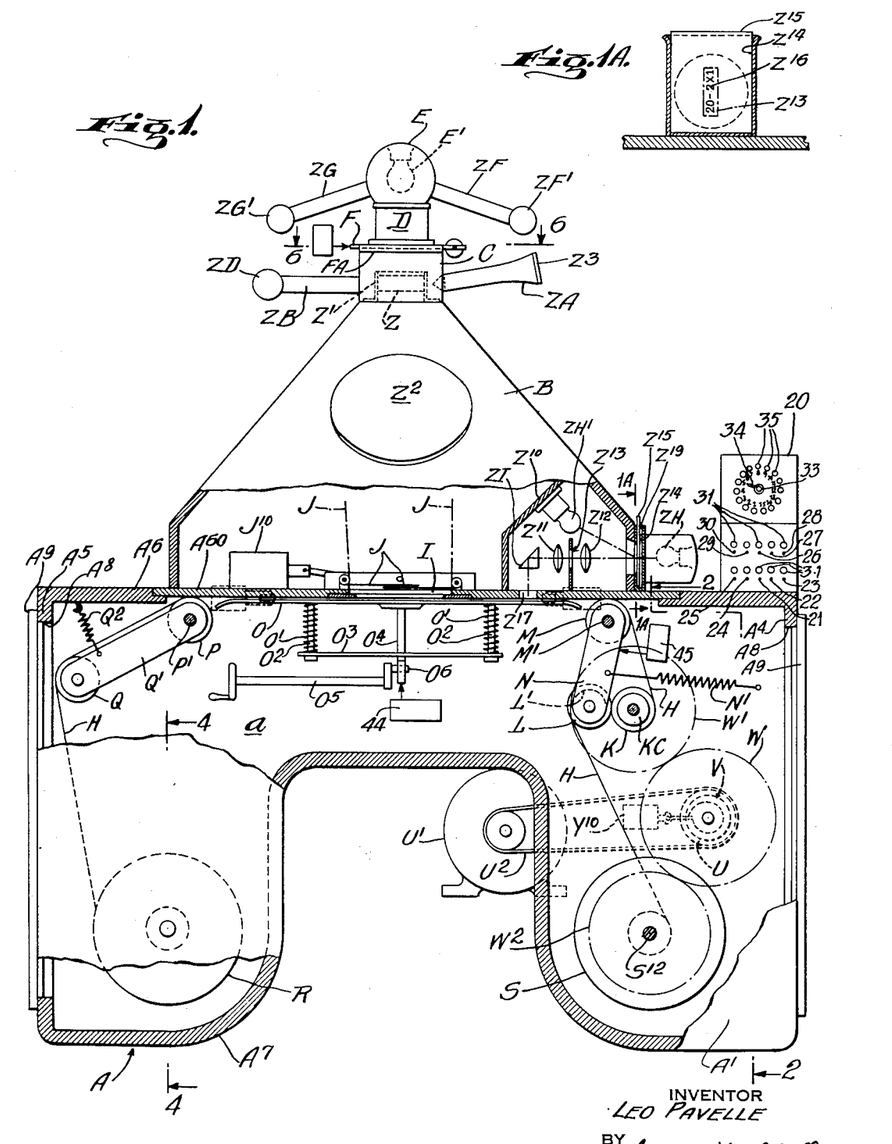
Fig. 1 is a somewhat diagrammatic elevation, partly in section, of one form of my improved printer.
Fig. 1A is a partial section on the line 1—1 of Fig. 2.

The optical projection printer shown by way of example somewhat diagrammatically in Fig. 1, and in more detail in other figures, comprises a housing structure or frame including a lower or base section A, a projector housing B above and supported by the base section A, and a main lens section C, a condenser lens section D, and a lamp housing E above the housing B and arranged one above another in the order stated. As hereinafter explained, the housing sections B, C, D and E may be rigidly connected to form a structural unit removably mounted on the base section A for use interchangeably with an analogous unit or units which may differ from one another in some respects.

Figures 6, 7, 8:
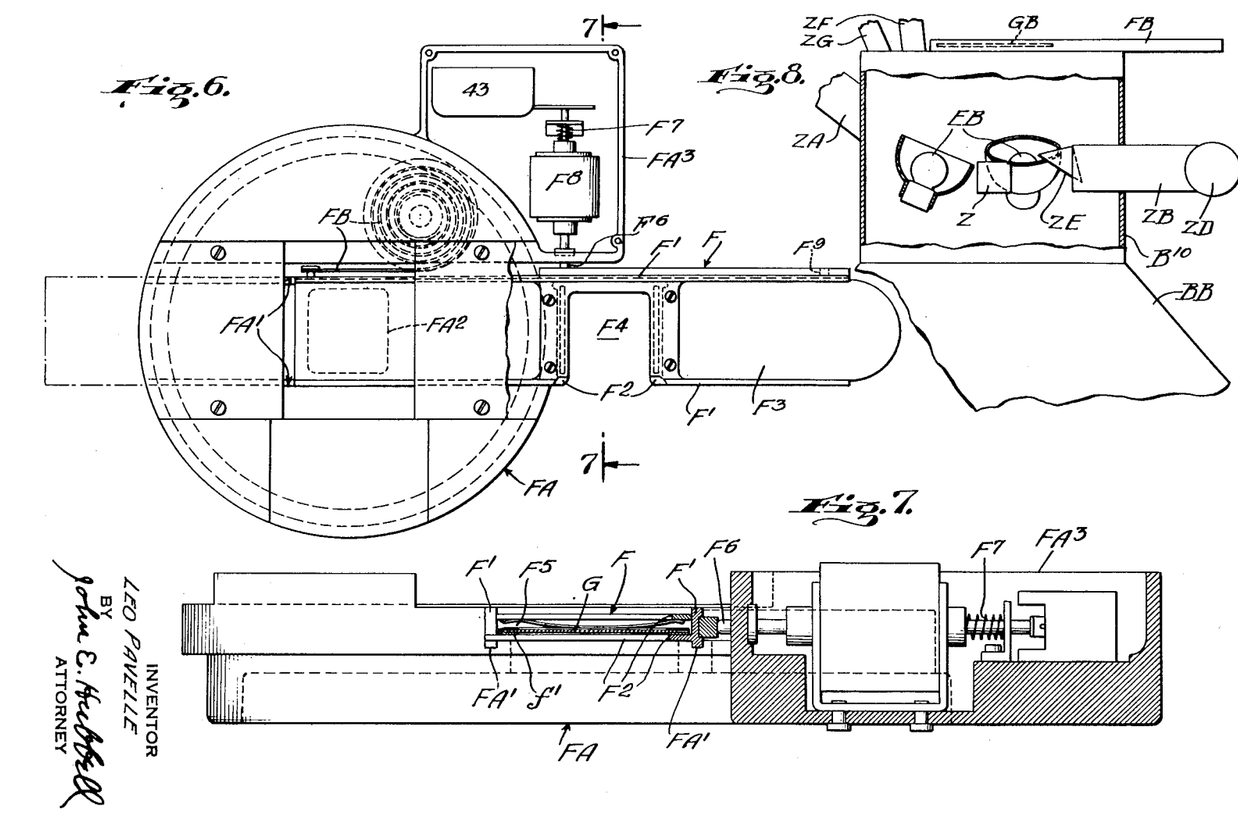
Fig. 6 is a plan section on the line 6—6 of Fig. 1 illustrating the holder for the picture to be reproduced and associated mechanism.
Fig. 7 is an elevation partly in section of the apparatus shown in Fig. 6.
Fig. 8 is a diagrammatic sectional elevation illustrating a modification for reproducing pictures by reflected light.

The particular lamp housing and lens arrangement shown in Fig. 1 is intended for use in reproducing pictures by transmitting light from a lamp E' in the lamp housing E through a transparent picture G supported in a picture holder F. Ordinarily, the printing lamp E' is an incandescent electric lamp E' having a tungsten filament. The printer housing includes a guideway part FA intermediate the housing sections C and D, in which the picture holder F is slidable between a position in which its picture supporting seat F' is outside of the camera structure, as shown in Figs. 6 and 7, to permit the insertion and removal of the picture G, and an operative position in which the picture in the holder is within the printer structure and extends across the optical axis of the camera, and in which the picture holder is locked in place by means shown in Fig. 6, and hereinafter described.

As shown, the base portion A of the printer structure comprises parallel vertical side walls A', $A^2$ and $A^3$, end walls $A^4$ and $A^5$, a top wall $A^6$ and bottom wall $A^7$. Those walls enclose a light proof compartment $a$. The top wall includes preferably a removable section $A^{60}$ shown in Figs. 9 and 10. As shown, the end walls $A^4$ and $A^5$ are formed with doorways or openings $A^8$ normally closed by door or cover parts $A^9$. The compartment $a$ normally encloses a strip H of sensitized material and feed or transport mechanism for intermittently moving successive sections of the strip into register with an orifice I formed in the top wall part $A^{60}$ of the compartment $a$. The orifice I is normally closed by a shutter which may take various forms and the specific construction of which forms no part of the present invention.

In the particular form shown by way of example, the shutter is of the type comprising a pair of shutter flaps J and JA pivotally supported on pintles or shafts J' and JA', respectively. The shafts J' and JA' are journalled in suitable bearings supported by the top wall part $A^{60}$ adjacent, and parallel to, opposite edges of the orifice I, and are biased to turn the flaps into their overlapping closed positions shown in Fig. 11. The shaft J' carries a crank arm $J^2$ connected by a corresponding link $J^3$ to a crank pin $J^4$ carried by a crank arm $J^5$. The crank arm $J^5$ is carried by a crank shaft $J^6$ which also carries a crank arm $J^7$. The shutter shaft JA' carries a crank arm $JA^2$ connected by a corresponding link $JA^3$ to the crank pin $J^4$. As shown, the crank arm $JA^2$ is longer than the crank arm $J^2$ so that the shutter flap JA lags behind the shutter flap J in the shutter opening movement and precedes the flap in its return to its closed position. The crank arm $J^7$ is connected by a link $J^8$ to the armature or core $J^9$ of an electromagnet or solenoid $J^{10}$. In the closed position of the shutter the solenoid $J^{10}$ is deenergized and its core $J^9$ is partially withdrawn from the solenoid by the link $J^8$ as a result of the bias force which normally holds the flaps J and JA in their closed overlapping positions. The flaps J and JA are turned into their open positions by the electromagnet or solenoid $J^{10}$ when the latter is energized.

The transport or feeding mechanism within the compartment $a$ for supporting the sensitized material strip H and intermittently advancing successive sections past the orifice I, comprises an intermittently rotated measuring roller K and a pressure roller L. The feed of the strip H is directly controlled by the roller K. The pressure roller L presses the strip H against the measuring roller K and prevents the strip from slipping over the roller K, which is the active strip feeding element. The rollers K and L cooperate to draw the strip H from a flanged feed spool R along a path defined by a guide roller M, a presser plate O, a guide roller P, and a tension roller Q. The presser plate O forms the bottom wall of horizontal strip guideway at the top of the compartment $a$. The guide roller M is an idler roller located at the end of said horizontal guideway adjacent the rollers L and K. The roller M has axle shaft extensions M' at its ends which are supported by and journalled in the housing wall portions A' and $A^2$. As shown in Fig. 1, the strip H passes down from the right side of the roller M to the right side of the roller K, and thence along the underside of the roller K and upward through the roll-pass between the rollers K and L. The strip then passes over the upper half of the roller L and passes from the left side of the latter downward to the right side of a flanged take-up spool S.

The pressure roller L has shaft extensions at its ends which are journalled in the lower ends of the links or rocker arms N. The latter have their upper ends secured to the shaft extensions M' of the roller M, which with the arms N and roller L form a rocking structure for swinging the roller L toward and away from the measuring roller K. As shown, the pressure which the roller L exerts against the roller K through the interposed strip H results from, and depends upon the tension of a spring N' having one end fixed and having its other end connected to said rocking structure. The rollers K and L customarily comprise metallic shaft or body portions KC and L', respectively, and peripheral portions formed of rubber or analogous yielding material each surrounding and secured to the corresponding shaft portion.

As shown, the presser plate O is supported by the removable top wall section $A^{60}$ and is biased for upward movement by springs O' which surround vertical guide pins $O^2$. The latter have their upper ends threaded into, or otherwise secured to the removable top wall member $A^{60}$. The lower ends of the pins $O^2$ are secured to and support a stationary horizontal plate $O^3$. The springs O' act between the plates O and $O^3$.

A vertical stem or bar $O^4$ secured at its upper end to the presser plate O adjacent the center of the latter, forms means through which the presser plate may be lowered against the action of the springs O'. Such lowering of the plate O facilitates the threading of the leader end of a strip H through the guideway when a sensitized strip unit is being put in service. The stem $O^4$ extends through the stationary plate $O^3$, and is accessible for manual engagement to depress the plate O when one of the end doors $A^8$ of the chamber $a$ is removed. As diagrammatically shown, a manually operable crank shaft $O^5$ mounted in the chamber $a$ and having a crank pin $O^6$ extending through a slot in the bar $O^3$ may be used to lower the bar $O^4$.

Figures 9, 10, 11:
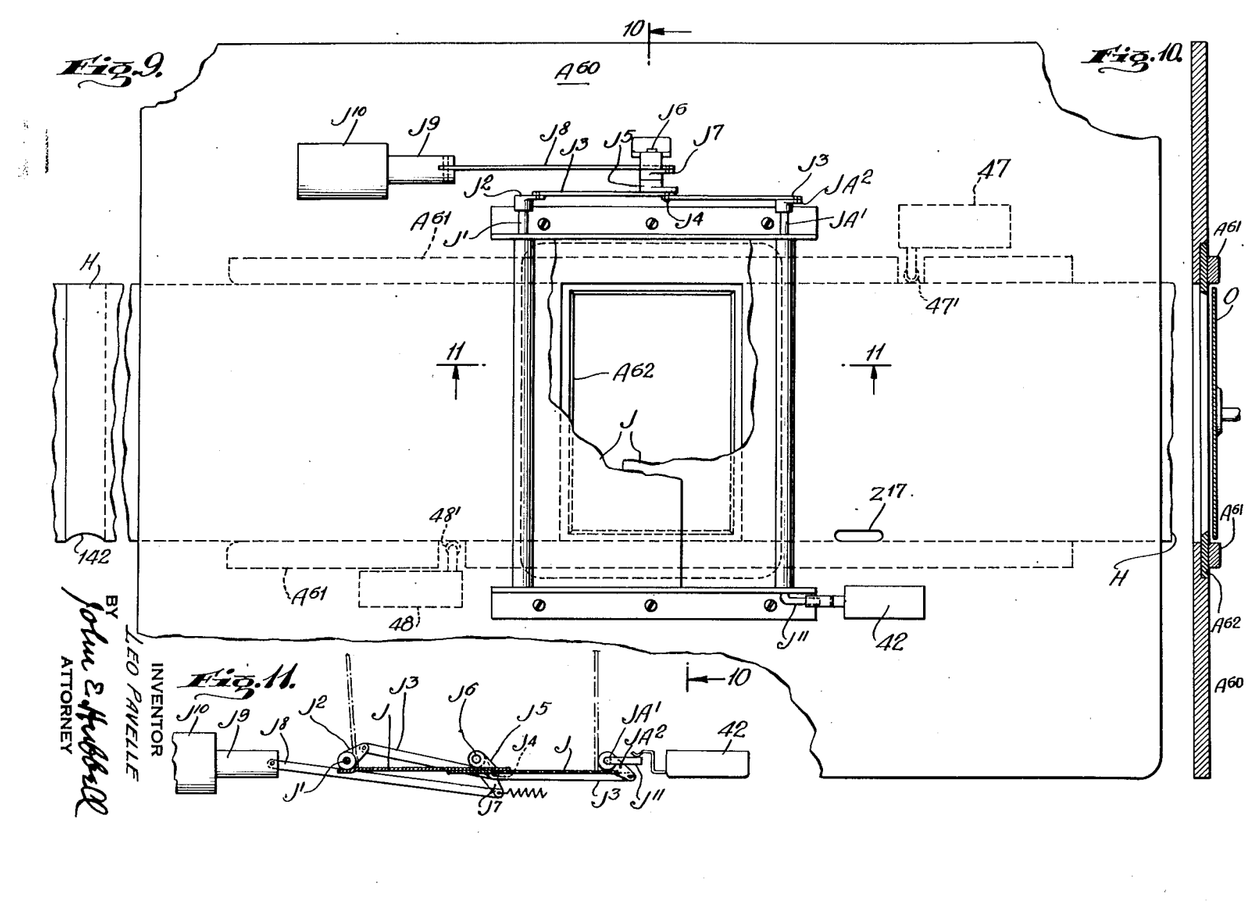
Fig. 9 is a plan view of the portion of the printer housing in which the shutter orifice is formed.
Fig. 10 is a section on the line 10—10 of Fig. 9.
Fig. 11 is an elevation on a larger scale than Fig. 1 of the shutter actuating mechanism shown therein.

As is shown in Figs. 9 and 10, guide strips $A^{61}$ are secured to the underside of the removable top wall section $A^{60}$ to serve as side edges of the guideway through which the strip H is moved. Advantageously, the presser plate O is of a width to enter and extend for substantially the full width of the space at the underside of the plate $A^{60}$ and between the guides $A^{61}$. As shown, the marginal edge of the actual shutter orifice, is formed by a mask $A^{62}$. The latter is shown as a thin plate formed of metal or plastic of rectangular outline and having a rectangular shutter orifice somewhat smaller than the orifice opening in the plate $A^{60}$. The orifice member $A^{62}$ is clamped between the underside of the plate $A^{60}$ and guide strips $A^{61}$ attached thereto. The shutter flap members and shutter operating solenoid are mounted on the plate $A^{60}$.

The strip material H passes into the left-hand end, as seen in Fig. 1, of the guideway above presser plate O, from an idler roller P having its axle shaft extension P' supported by and journalled in the frame walls A' and $A^2$. The strip H passes to the idler roller P over a tension take-up roller Q from the feed spool R. The roller Q is journalled in the lower end of rocker arms Q' which have their upper ends secured to the shaft extensions P'. The rocking element including the roller Q and rocker arms Q', is biased against movement in the counter-clockwise direction out of its position shown in Fig. 1, as by means of a spring $Q^2$ having one end attached to the rocker structure, and the other end attached to the framework of the camera.

Figures 2, 3:
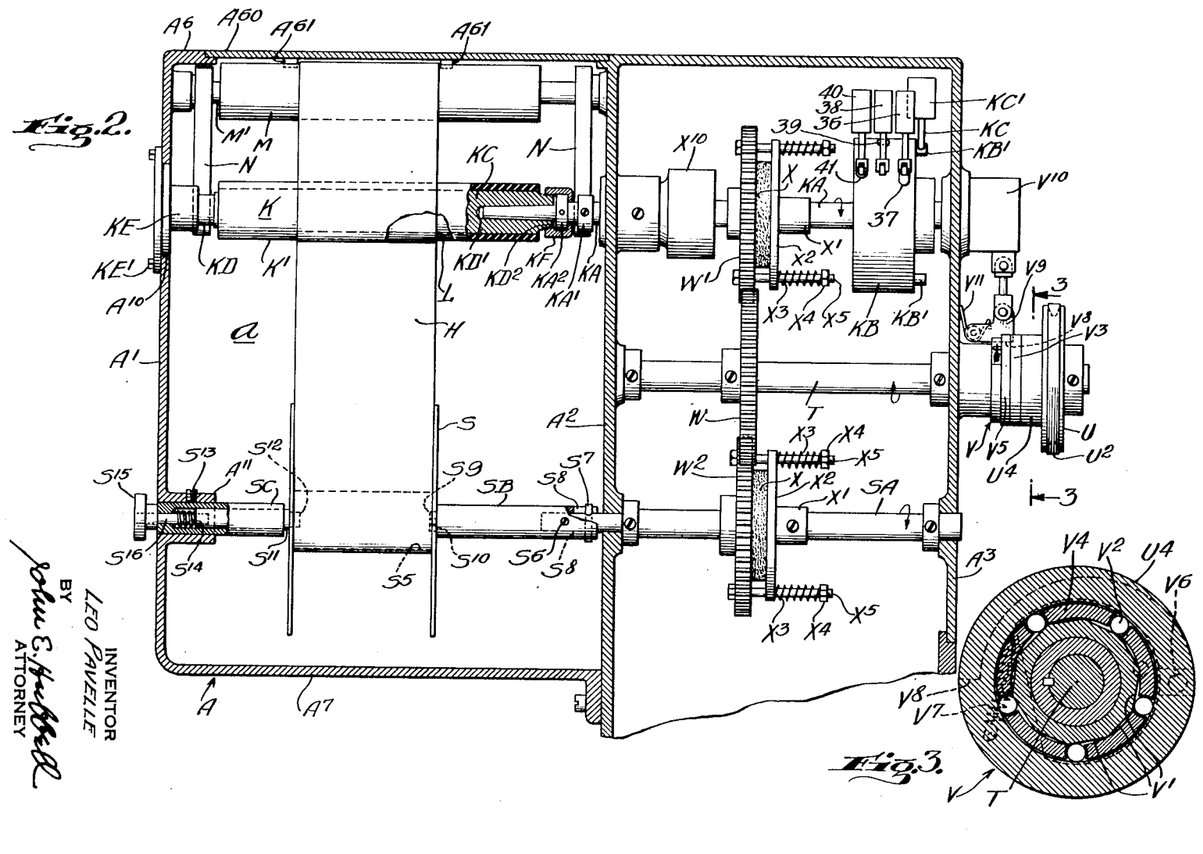
Fig. 2 is a partial sectional elevation taken on the line 2—2 of Fig. 1.
Fig. 3 is a section on the line 3—3 of Fig. 2 illustrating a clutch mechanism.

As shown in Fig. 2, the measuring roller K and take-up spool S, are detachably connected to their respective driving shafts KA and SA. Each of those shafts has one end extending through and journalled in the frame wall $A^2$, and has its other end journalled in the frame wall $A^3$. The mechanism shown for rotating the measuring roller K and take-up spool S through their respective driving shafts KA and SA, comprises driving mechanism external to the chamber $a$ and supported by the frame plates or walls $A^2$ and $A^3$. The main drive shaft T of the feeding mechanism extends through and is journalled in and supported by the walls $A^3$ and $A^2$. At the side of the wall $A^3$ remote from the wall $A^2$, the shaft T supports a pulley U and a clutch mechanism which comprises a part V secured to the shaft T and associated clutch parts operable to clutch the pulley U to the shaft T, or to permit the pulley to turn freely on said shaft. The pulley U is continuously rotated by a driving motor U' through a belt $U^2$.

The clutch comprising the part V is a so-called one revolution clutch of well known type. In the conventional form of the clutch illustrated, the member V comprises an elongated tubular body portion with flat sides V' uniting to give said body portion a polygonal outline. Rollers or locking dogs $V^2$ parallel to shaft T are located between the flat sides V' of the clutch part V and a surrounding cylindrical flange or shell portion $U^4$ of the pulley U. The rollers $V^2$ are adjusted angularly about the axis of the shaft T by a cage or hub portion $V^4$ of a clutch member $V^3$ surrounding the clutch part V and angularly adjustable relative to the latter to the small extent required to move the rollers $V^2$ along the flat sides V' between the position in which they permit the pulley shell $U^4$ to turn freely relative to the shaft and the position in which the rollers jam between said shell and the flat surfaces V' so that the pulley rotates the shaft T.

The rollers $V^2$ are adjusted into and out of their locking positions by an actuating member $V^5$. The latter is an annulus which loosely surrounds the part V, and has a loose pivotal connection $V^6$ with the member $V^4$, and is connected to the member V by a tension spring V⁷. The spring V⁷ tends to turn the member V⁵ and thereby the member V³ in the counter-clockwise position as seen in Fig. 3, so as to thereby cause the rollers V² to jam between the flat surfaces V' and the surrounding shell U⁴ and thus lock the pulley U to shaft T.

During each strip feeding movement, the shaft T is clutch-connected to the pulley U, and thereby given one complete revolution. At the end of that revolution, a shoulder V⁸ of the annulus V⁵ engages a locking dog or stop V⁹. This arrests the angular movement of the shoulder V⁸ and gives the member V⁵ the slight angular adjustment in the clockwise direction relative to the member V required to move the rollers V² out of their locking positions, and thus interrupts the rotative movement of the shaft T. Each of the successive rotative movements of the shaft T intermittently effected in the normal operation of the camera is initiated by the temporary energization of a solenoid V¹⁰ which when energized pulls the stop V⁹ away from the shaft T and out of the path of movement of the shoulder V⁸. The stop V⁹ is returned to its position in the path of the shoulder V⁸ by a bias spring V¹¹ as soon as the solenoid V¹⁰ is deenergized.

A spur gear W mounted on and rigidly connected to the main drive shaft T, meshes with and drives a spur gear W' mounted on the drive shaft KA for the measuring roller K and meshes with and drives a spur gear W² which is mounted on the drive shaft SA for the take-up spool S. The spur gear W' drives the shaft KA through a friction clutch which comprises a disc X of suitable non-metallic material secured to a metal hub portion X' which surrounds and is secured to the shaft KA. The disc X has one side engaged by an annulus X² which turns with the gear W'. The gear W' and annulus X² are spring pressed against the opposite sides of the disc X by springs X³ on the side of the annulus X² remote from the gear W' and abutment nuts X⁴ on bolts X⁵ extending through the plate X² and secured to the gear W'. The gear W² drives the take-up roller shaft SA through a friction clutch which may be and as shown is exactly like the clutch through which gear W' drives the shaft KA.

Associated with the shaft KA are means through which each feeding movement of the measuring roller K is positively restricted to a definite angular movement. That movement as shown is 180°, but may be 120°, or some other aliquot part of 360° as conditions make desirable. Each feeding movement of the roller K is restricted to movement of 180 degrees by means of a stop or locking dog KC which is biased for movement into a locking position in which it is adapted to engage and arrest the turning movement of one or the other of two projections TB' carried at the end of a drum KB secured to said shaft KA. The two projections KB' are symmetrically disposed at opposite sides of the shaft KA. The stop or locking dog KC is biased for movement into its locking position but is retracted from its locking position by a solenoid KC' when the latter is energized. As hereinafter explained, the solenoid KC' is energized to permit initiation of each feeding movement of the strip H, and is deenergized in time to permit the return of the locking dog KC' into its locking position, in time to terminate that feeding movement.

To avoid risk of reverse rotation of the measuring roller K due to the tension of the strip material passing into engagement with the measuring roller from the tension roller Q, a one-way clutch X¹⁰ which may be of well known type is employed. The one way clutch X¹⁰ acts between the shaft KA and the frame plate A² in a well known manner to prevent any rotative movement of the shaft KA in the clockwise direction as seen in Fig. 1.

As has been made apparent, the measuring roller K controls the feeding movements of the sensitized material strip H, and the longitudinal movement given the strip H in each feeding operation depends upon the corresponding angular movements of the roller K and the circumferential extent of said roller. The rim portion of the roller K which is formed of rubber or analogous material inevitably wears away in extended service, this requires replacement of the measuring roller K from time to time to insure uniformity in the strip feeding operations obtained with a measuring roller of given dimensions. Moreover, the replacement of one measuring roller by another of different size is desirable from time to time, to permit pictures of different sizes to be printed on sections of the strip H of different lengths.

To facilitate the ready replacement of the measuring roller K, the end of the drive shaft KA extending into the compartment a is detachably connected to the adjacent end of the aligned metallic shaft portion KD of the roller K, on which the rubber rim portion is mounted. The opposite end of the shaft KD is journalled in a bearing part KE detachably secured to the frame plate A'.

The detachable connection between the adjacent ends of the aligned shaft sections KA and KD comprises a tapered socket KD' in the end of the shaft section KD and a tapered end portion of the shaft KA and a coupling nut KF swiveled on the shaft KA between the collars KA' and KA² secured on the shaft KA. The nut KF has an internally threaded cavity receiving the externally threaded portion KD² of the adjacent end of the shaft section KD. When the coupling nut is rotated in the direction to force the collar KA² toward the end of the shaft KD, the tapered end of the shaft KA is forced into binding engagement with the wall of the socket KD'. When the coupling nut KF is rotated in the reverse direction relative to the shaft KD', the nut moves longitudinally of the shaft KA until it engages the collar KA'. Thereafter, further rotative movement of the nut KF in the same direction forces the shaft section KD away from the shaft section KA and thus breaks the frictional driving connection between the tapered end of the shaft KA and the wall of the socket KD'.

The continued rotation of the member KF in the last mentioned direction disconnects it from the shaft section KD and permits the latter to be withdrawn from the chamber a through the opening A¹⁰ in the wall A in register with the roller K and normally closed by the bearing part KE. The latter comprises a hub portion extending into the chamber a and supporting a bearing into which the adjacent end of the shaft section KD is normally received. The member KE also comprises an outer flange portion which overlaps the outer side of the wall plate A at the margin of the opening A¹⁰ and is normally secured to the plate A' by clamping screws KE'.

Figure 4:
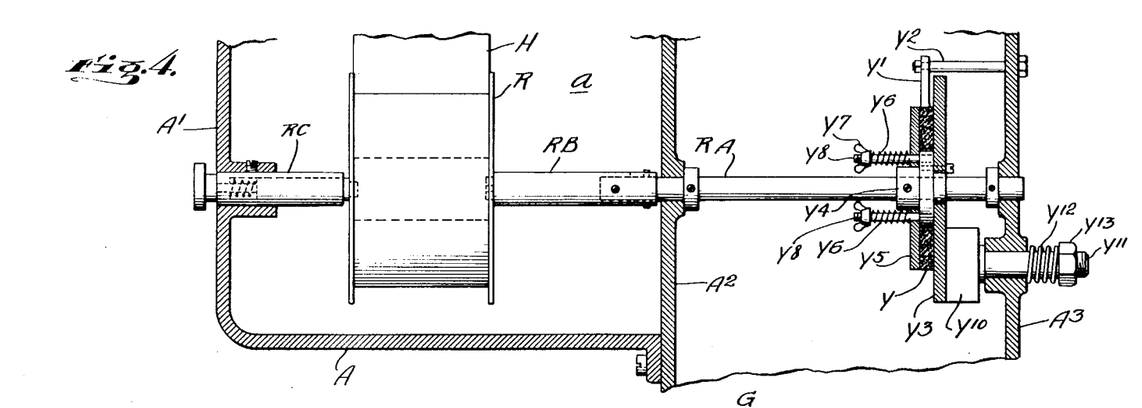
Fig. 4 is a partial sectional elevation taken on the line 4—4 of Fig. 1, illustrating the feed roll supporting and braking mechanism.

To avoid over-travel of the strip material H away from the feed spool R, and to suitably control the tension of the material H passing through the printing position to the measuring roll K, the feed spool R is secured to one end of a coaxial brake shaft RA. As is shown in Fig. 4, the shaft RA is mounted in and extends through the wall plate $A^2$ and is operatively connected to braking mechanism outside the compartment $a$. Said braking mechanism parts include an apertured disc or annulus Y of non-metallic material adapted for friction brake use, through which shaft KA extends. The part Y is anchored against rotative movement about the axis of the shaft RA by means of an arm Y' secured to the part Y and connected to an anchor stud $Y^2$ carried by the plate $A^2$. The disc Y has one side in engagement with one side of a metallic disc or member $Y^3$ surrounding the shaft RA and secured through a hub member $Y^4$ which extends through and centers the annular part Y. The opposite side of the part Y is engaged by a metallic annular plate $Y^5$. The members $Y^3$ and $Y^5$ are pressed against the opposite sides of the member Y by springs $Y^6$ acting between the plate $Y^5$ and adjustable abutment nuts $Y^7$ on studs $Y^8$ anchored in the hub portion $Z^4$ of the member $Z^3$ in the hub $Y^4$. The non-rotatable member Z in conjunction with the members $Y^3$ and $Y^5$ which turn with the shaft RA subject the feed spool R as the strip material H is being drawn away from the latter by the measuring roll K to a yielding braking load.

The braking mechanism associated with the shaft RA operating to interrupt the rotative movement of the feed spool R shortly prior to the completion of each strip advancing movement of the measuring roller K. The feed spool is then held by the last mentioned mechanism against further rotative movement, until the initiation of the next feeding movement of the roller K. The movement of the feed spool R is thus interrupted by the electro-magnetic interaction of an electro-magnet $Y^{10}$ with the previously mentioned disc $Y^3$, which is made of soft iron or other material enabling the disc $Y^3$ to act as an armature for the electromagnet $Y^{10}$. The metallic body or magnetic field portion of the electromagnet $Y^{10}$ has an axial stem extension $Y^{11}$ which is parallel to the feed spool shaft RA and extends through the wall $A^2$. A spring $Y^{12}$ acting between the wall $A^2$ and an abutment nut $Y^{13}$ threaded on the end portion of stem $Y^{11}$, external to the chamber $a$ holds the electromagnet $Y^{10}$ out of engagement with the member $Y^3$ when the electromagnet is deenergized. When the latter is energized, however, it moves against the action of the spring $Y^{12}$ into engagement with the adjacent side of the soft iron disc $Y^3$ adjacent the periphery of the latter. The electric magnet $Y^{10}$ is designed so that when energized it subjects the member Y to a braking or locking force.

When the rotative movement of spool R is interrupted prior to the completion of each feeding movement of the measuring roller K, the portion of the strip H between the measuring roller K and the feed spool R is subjected to an increased tension which is regulated by the tension of the spring $Q^2$. The latter yields to permit such counter-clockwise movement of the links Q' and tension take-up roller Q as is required to complete the movement of the strip H into register with the orifice which before the feeding movement of the measuring roller K is terminated. The increase in strip tension due to the action of the tension take-up roller Q, insures that the portion of the strip H in register with the orifice I will be suitably taut and smooth while a picture is being printed thereon.

The replacement of an empty feed spool R by a spool on which another strip unit H is wound, and of a take-up spool S on which an exposed sensitized material strip H has been wound by an empty-take-up spool, is effected through the doorways $A^8$ in the walls $A^4$ and $A^5$ of the chamber $a$ when the covers or doors $A^9$ normally closing those doorways are removed. As is clearly shown in Fig. 2, the shaft SA is normally connected to the adjacent end of the take-up spool S mounted in the printer by means of a tubular extension SB which has one end in splined engagement with the barrel or body portion $S^5$ of the spool S, and into the other end of which the shaft SA is secured by a set screw $S^6$ and a pin or key $S^7$ extending through the shaft SA and having its ends received in open ended slots $S^8$ in the tubular shaft SB. The reduced ends $S^9$ of the part SB extends into a socket in the adjacent end of the take-up spool and the latter is prevented from rotating relative to the shaft part SB by a spline connection $S^{10}$.

The end of the spool S adjacent the housing wall A' is supported by means comprising a tubular shaft SC and a plunger S'' mounted in the shaft SC and having a projecting end portion $S^{12}$ extending into a socket in the adjacent end of the spool S. The tubular shaft SC has its end remote from the spool S anchored by a set screw $S^{13}$ in a boss or tubular projection A'' from the inner side of the wall A'. The plunger S'' is normally held in engagement with the spool S by a bias spring $S^{14}$. The plunger S'' may be moved away from the spool S by means of a knob $S^{15}$ at the outer side of the wall A' and connected to the plunger S'' by a stem $A^{16}$. When the plunger S'' is pulled away from the spool S the latter may be moved out of engagement with the shaft SB and removed from the chamber A through the adjacent doorway $A^8$, after which an empty take-up spool may be mounted on the supporting shaft parts $S^{10}$ and $S^{12}$. To accommodate a take-up spool longer or shorter than the spool S shown, the tubular shaft sections SB and SC may be replaced by shaft sections respectively similar to, but shorter or longer than the shaft sections SB and SC. Each plunger S'' has a length corresponding to the length of the shaft section SC in which it is mounted.

The mechanism illustrated in Fig. 4 for releasably mounting a feed spool R in bearings in the wall plate A' and $A^2$ so as to permit the ready replacement of an empty feed spool by a full feed spool, comprises a tubular extension RB of the shaft RA journalled in the wall $A^2$ and a shaft section RC mounted in the wall A'. The shaft sections RB and RC may be exactly like the take-up spool shaft sections SB and SC in form and in respect to their association with related parts, except that there is no spline connection between the feed spool R and the shaft section RC since the latter does not share the rotative movements of the spool.

The picture holder F is mounted in a horizontal guideway FA' which as clearly shown in Figs. 6 and 7, is formed in a housing part FA. The latter is ordinarily a metallic casting interposed between the main lens housing C and the condenser housing D. The opposite sides of the guideway FA' are located at opposite sides of the optical axis of the camera.

The housing part FA comprises a web portion forming a light proof partition between the housings C and D except for a window FA² which is shown as square and centrally disposed with respect to the optical axis of the printer.

The picture holder F comprises side members F' in the form of vertical bars engaging the side walls of the guideway FA', transverse frame members F² and a web portion F³. The latter is integrally connected to members F' and F² and extends for the full length of the picture holder, except where cut away to form an opening F⁴. The latter is formed in the bottom wall of a picture seat portion F⁵ of the holder F, located between the transverse ribs F². As shown, the member F' at one side of the picture holder is cut away between the ribs F² to permit a picture G to be moved horizontally into the seat F⁵. Advantageously, and as shown each picture is mounted in a rim or edge frame f'. The frame f' may be formed of sheet metal, paper, plastic or other material and is shaped and proportioned to fit in the seat F⁵ closely enough to insure proper centering of the picture with respect to the opening FA², and loosely enough to permit the picture holder to be readily inserted in and removed from its seat. The usual provisions, which need not be described, may be made to prevent the passage of light into the housing structure through the ends of the guideway FA' when the picture holder is in its printing position.

Figure 5:
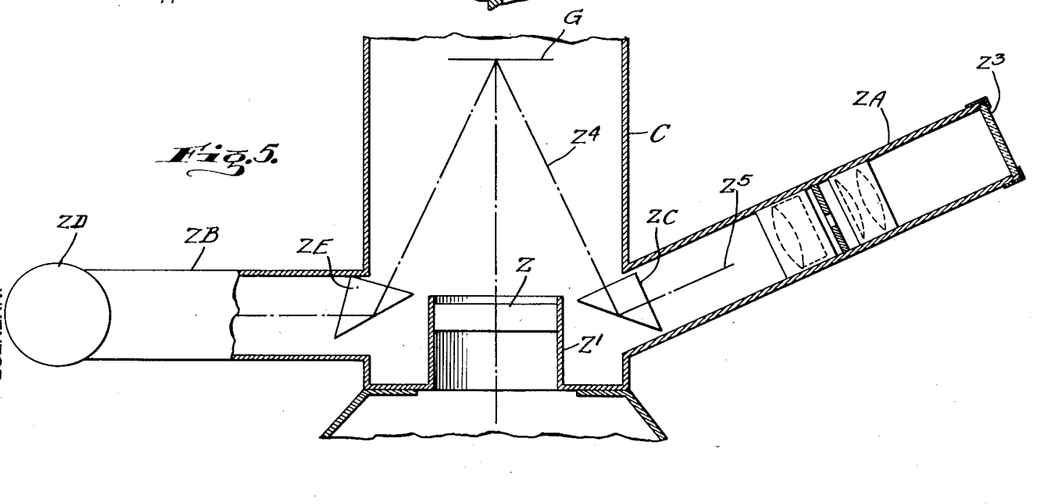
Fig. 5 is a vertical section on a larger scale than Fig. 1 showing light deflecting means.

A spring FB mounted in the housing part FA and connected to the picture holder F biases the latter for movement into its non-operative position shown in Fig. 5 in which the picture seat F⁵ is exposed. As shown, the spring FB is a spiral spring of the type customarily employed in typewriters to bias the typewriter carriage movement to the right, and need not be further described or illustrated since its specific form constitutes no part of the present invention. In normal operation when the picture holder is pushed into its printing position in which its picture seat F⁵ is in register with the opening FA², the holder is locked in place by a locking part F⁶ mounted on a platform extension FA³ of the housing part FA. A spring F⁷ biases the part F⁶ for movement into its locking position. At the end of each printing operation or series of printing operations the locking dog F is pulled out of its locking position by a solenoid F⁸ which is then energized as hereinafter described.

The main optical system of the printer comprises a main lens Z and a condensing lens interposed between the picture G and the light source E'. The condensing lens in the housing D may be of conventional type and form and need not be illustrated or described. The lens Z may also be of conventional type for use in a projection printer of the non-focusing, or fixed focus type. In such a printer the lens is not adjusted to vary the magnification factor though, advantageously, the lens is capable of a limited adjustment in the direction of its optical axis to insure the sharpness of focus desired. As shown in Fig. 1, the lens Z is mounted with some capacity for vertical adjustment in a tubular support Z' having its lower end connected to and supported by the lower end of the lens housing C. To permit of the adjustment, inspection and cleaning of the lens Z, the pyramidal projection housing B is formed with an access opening in one of its flat sides. That opening may be of the order of eight inches in diameter, and is normally closed tight by a removable cover Z².

As shown, a viewing tube ZA and an exposure control tube ZB extend through and are connected to and supported by the housing C. The axis of tube ZB, in the arrangement shown, is radial to the optical axis of the printer, but the axis of the viewing tube ZA, while in a plane radial to the optical printer axis, is at an angle upwardly inclined away from the horizontal plane intersecting the printer axis. As diagrammatically shown in Fig. 7, the viewing tube ZA comprises a tubular shell supporting an eye piece Z³ at its outer end. The latter receives light transmitted through the picture G from the light source E' and condensing lens to and reflected by the hypothenuse side of a right angle prism ZC. The other two sides of the prism ZC are respectively perpendicular to the incident portion Z⁴ and to the reflected portion Z⁵ of a light ray passing from the center of the picture G to the center of the eye piece Z³. The inclination of the tube ZA to the horizontal as shown is essential, as those skilled in the art will understand, to permit the use of a prism which is a right angle prism and is laterally displaced from the printer axis, gives an undistorted image at the eye piece of the picture G.

The control tubes ZB supports at its outer end a photoelectric tube ZD which receives light reflected from the hypothenuse side of a corresponding right angle prism ZE. The latter is supported partly in the housing C and partly in the tube ZB, to receive light from the negative G and to reflect that light to the photoelectric tube ZD. With the tube ZB extending radially away from the housing C and with the prism ZE a right angle prism laterally displaced from the printer axis as shown, the image of the reproduced picture transmitted to the cathode of photoelectric tube ZD will be distorted. Such image distortion is advantageous when the tube ZD is employed as the photoelectric control tube of phototube in an automatic exposure timing system such as that disclosed in the Jacob Rabinowitz Patent 2,469,076, of May 3, 1949. In that system the exposure period is automatically increased and decreased as the intensity of the light transmitted through the picture G respectively increases and decreases.

While it is not theoretically essential that either of the prisms ZC and ZE should be a right angle prism, the use of right angle prisms is practically advantageous, since such prisms are produced in quantities in suitably varied sizes, and do not have to be specially ground or made to order. With the prisms ZC and ZD laterally displaced from the optical axis of the printer as shown, transmission of light from picture G to each prism and thence outwardly through the corresponding tube ZA or ZB does not diminish or in any way modify the light transmitted from the picture G to the main lens Z and thence to the portion of the strip H on which a picture is to be printed.

As shown in Fig. 1, two tubes ZF and ZG each have one end attached to the lamp housing E and disposed so that the cathodes of photoelectric tubes ZF' and ZG' respectively mounted in the outer end of the tubes ZF and ZG will each receive light from the lower portion of the bulb of the electric lamp E' which directly radiates light through the condensing lens D and thence to the lens E and prisms ZC and ZE. The photoelectric tubes ZF' and ZG' are adapted for use in a printing lamp color temperature control system disclosed and claimed in the Jacob Rabinowitz Patent No. 2,433,624, of December 30, 1947. For the purposes of the control system of that application, the tube $ZG'$ is relatively more responsive to the blue ray component of the light emitted by the lamp E than is the tube $ZF'$.

In said color temperature control system, the phototube $ZF'$ operates through the relay mechanism to increase the energizing voltage impressed on the lamp E as required to maintain the response of the tube $ZF'$ to the light received by it approximately constant, notwithstanding the progressive decrease in the transparency of the light bulb during the operative life of the lamp as a result of the coating or deposit formed on the inner wall of the lamp wall. In said system the phototube $ZG'$ is employed to automatically determine when a lamp $E'$ previously in use should be replaced, because the blue ray component of the light emitted by it is too high to permit such light to be used satisfactorily in printing pictures from natural color pictures or transparencies. The color temperature control system disclosed in the last mentioned Rabinowitz application gives a color picture light control which may be employed with advantage in the normal use of the printer invention disclosed herein, but which is not essential to the use of said invention.

In practice it is desirable that each picture printed should bear an identifying symbol. The printer shown in Fig. 1 comprises means including two optionally usable light sources ZH and $ZH'$ and a right angle prism ZI for printing an identifying number or symbol on each section of the strip H in the chamber $a$ immediately after a reproduction of the picture G has been printed on that section.

As shown in Fig. 1, the light sources ZH and $ZH'$ are lamps which with the prism ZI and a lens system, are mounted in a light proof housing $Z^{10}$. The lens system shown includes separate lens elements $Z^{11}$ and $Z^{12}$ with a small rectangular orifice $Z^{13}$. The housing $Z^{10}$ extends through a lower wall portion of the housing B. External to the housing B, the housing Z is formed with a transverse slot $Z^{14}$ in its upper side. The latter is adapted to receive a body $Z^{15}$ bearing an identifying symbol $Z^{16}$ to be printed on a marginal portion of the section of the strip H beneath the prism ZG to which the latter reflects light through an orifice $Z^{17}$ in the top wall of the chamber $a$. The usual spring shutter, felt body or like device $Z^{18}$, may be provided to prevent extraneous light from entering the housing $Z^{10}$ through the slot $Z^{14}$. The body $Z^{15}$ may be transparent except for the identifying symbols, and in such case the symbols may be reproduced by light transmitted through the body $Z^{15}$ from the lamp ZH. When the lamp $ZH'$ is used, the symbols are reproduced by reflected light and the body $Z^{15}$ need not be transparent.

In the preferred form of the invention, the body $Z^{15}$ is an envelope individual to, and forming a storage enclosure for the picture identified by the symbol on the envelope. In practice, the envelope $Z^{15}$ may have successive identifying numbers printed on them by an ordinary numbering machine. In reproducing each picture G, the operator removes the picture from its envelope $Z^{15}$ and inserts the picture in the picture holder F, and inserts the envelope in the slot $Z^{14}$. In the final stage of each picture printing operation, the section on which a reproduction has just been printed is advanced into the position below the opening $Z^{17}$ and one of the sources of light ZH and $ZH'$ is then momentarily energized, after which the picture is replaced in its envelope. By the use of simple envelope positions gauging device associated with the number printing machine and with the housing $Z^{10}$, the various numbers or symbols $Z^{16}$ are printed on similarly located portions of the different sections of the strip H. In consequence, after the strip has been developed and is being fed through a severing machine, the identifying numbers or symbols form light reflecting or modifying surfaces well adapted for use in the electronic control of the section severing operations.

Figure 12:
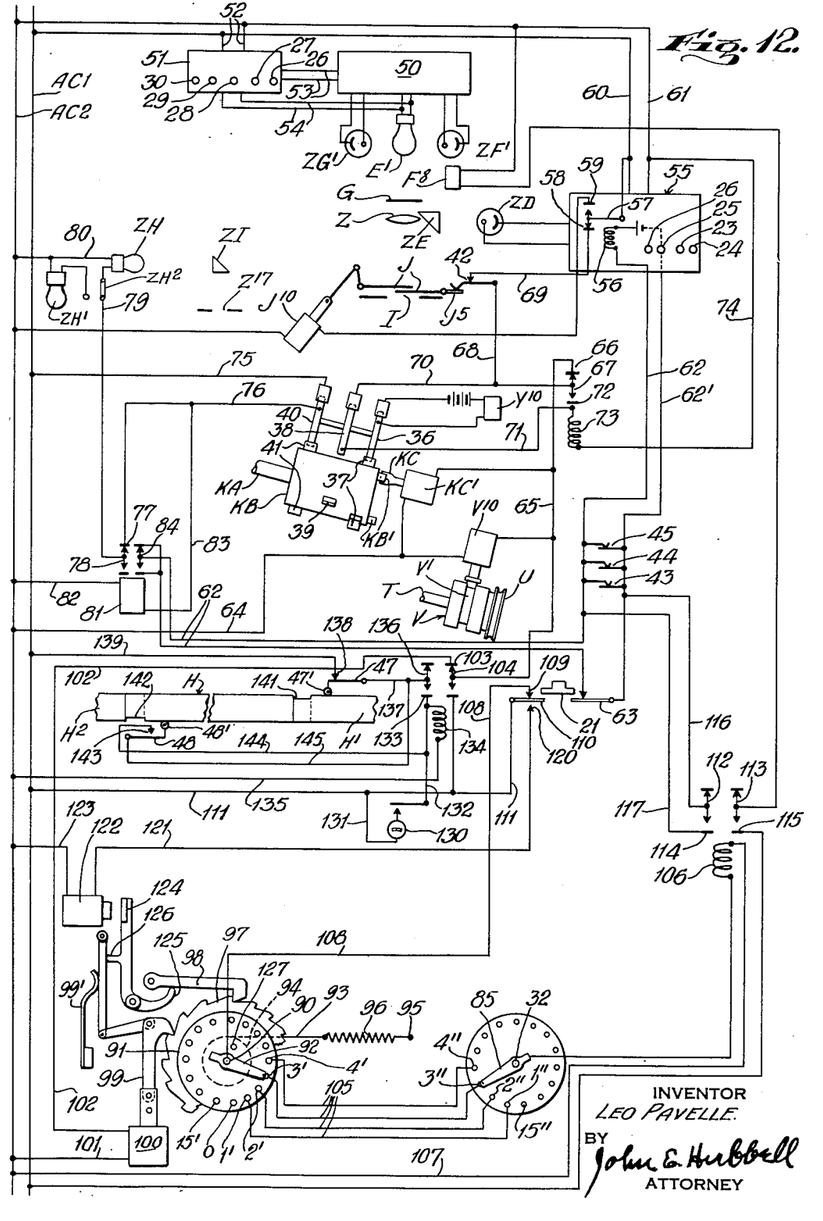
Fig. 12 is a control circuit diagram.

The automatic operation of the printer in the manner and for the purposes previously mentioned and hereinafter described in greater detail, is advantageously effected and controlled by a control system, the general features of one form of which are illustrated diagrammatically in Fig. 12. The manually operable control elements of the system, used in the regular operation of the printer, are mounted in a control panel 20 attached to the printer housing for convenient actuation by the printer operator. Ordinarily the duties of the latter also include the insertion in and removal from the printer of each picture G to be reproduced, and the envelopes from which the identifying numbers or symbols are printed on the different pictures made.

The control elements mounted in the panel 20 comprise a starting switch 21, exposure time regulation switches 22, 23, 24 and 25, printing lamp control switches 26, 27, 28, 29 and 30, and a selector switch 32. Actuation of each of the switches 21—30 is advantageously indicated by the energization of a corresponding pilot lamp 31. The selector switch 32 is a rotatable switch which can be manually turned by a knob 33 into any one of different positions corresponding in number to the number of pictures to be successively printed from one picture G, following a single actuation of the starting switch 21. The maximum number of pictures which can be printed from one negative in a single printing operation depends, of course, upon the design of the selector switch and associated mechanism. In the arrangement shown by way of example, the selector switch has fifteen different operative positions, indicated on the panel 20 by the numbers 1–15, with a pilot lamp 35 alongside each number. A pointer or index 34 of the switch 32 is successively moved into register with the different numbers as the switch is moved successively through its different operating positions. During each series printing operation the index 34 is in register with the number on the panel corresponding to the number of pictures being printed in that operation.

In addition to the control switches already mentioned, the control system includes switches 36, 38, 40, 42, 43, 44 and 45 actuated on the movements of particular printer mechanism parts into particular positions, and operating to suitably time different printer operations or to insure safe operation. The control system shown also includes switches 47 and 48 engaging the opposite edges of the strip H and its opaque leader and trailer end portions $H'$ and $H^2$, respectively. The switches 47 and 48 are employed, as hereinafter described, primarily to control the operation of the printer during the periods in which the leader $H'$ and trailer $H^2$ of each strip H are being wound on the take-up spool R.

The switches 36, 38 and 40 are actuated in accordance with changes in the angular position of the measuring roller K. As shown, the switches 36, 38 and 40 are normally open, while the roller K is in rotation, but are closed while respectively engaged by projections 37, 39 and 41 extending away from the periphery of the cylinder or drum KB carried by the driving shaft KA for the measuring roller K. Since in the particular arrangement shown, each operative movement of the roller K is through an arc of 180°, the projections 37, 39 and 41 are duplicated on diametrically opposed portions of the periphery of the drum KB.

The closure of the switch 36 energizes the brake magnet $Y^{10}$, and each of correponding projections 37 is elongated in the direction of its circular movement, so that the switch 36 will close somewhat prior to the completion of each feeding movement of the roller K, and will remain closed until the following feeding movement is initiated.

The closure of switch 38 effects circuit adjustments hereinafter described, controlling the operation of the series printing mechanism.

The projections 41 are so positioned that the switch 40 is closed at the end of each feeding movement of the roller K and as in hereinafter more carefully explained, each closure of the switch 40 results in the energization of one of the number printing lamp ZH and ZH', and the opening of the shutter J for printing each picture, except the first, of the plurality of pictures printed in a series printing operation. Whether the lamp ZH or lamp ZH' is energized depends on the position of the manual switch $ZH^2$.

The switch 42 shown in Figs. 9 and 2, is biased to its open position, but is closed by arm J'' carried by the shutter shaft JA' as the shutter flap 5A turns into its closed position.

The switches 43, 44 and 45 are safety switches respectively controlled by the positions of the picture holder F, presser plate O, and presser roller F, each being open or closed accordingly as its controlling element is, or is not, in its normal operative position.

The control system also includes various relay switches, circuit conductors and other control elements to which suitable reference will be made in the following description of the operation of the printer mechanism disclosed.

In the normal operation, lamp energizing current is supplied by supply conductors AC1 and AC2 to the printing lamp E, as required to insure the proper intensity of light transmission from the lamp through the negative G and lens C. Advantageously, the energization of the lamp E' is regulated by the response of the tube ZG' to the light emitted by the lamp E', as required to maintain the desired color temperature of the light. To this end use may advantageously be made of control apparatus 50, of the type and form disclosed in the application of Jacob Rabinowitz, Serial No. 600,863, filed June 22, 1945. In that apparatus, the tube ZG' increases the voltage impressed on the lamp E' as required to keep the intensity of the light received by the tube ZG substantially constant notwithstanding the progressively increasing deposit formed on the inner wall of the lamp envelope. As the lamp voltage is thus increased, the blue ray component of the light emitted by the lamp increases. In the apparatus 50, the photoelectric ZG', which also receives light emitted by the lamp E', is employed to determine when the blue ray component of the light emitted by the lamp becomes so high that the lamp E' should be replaced.

As shown, the apparatus 50 is connected to branches of the supply conductors AC1 and AC2 through a control device 51. The latter includes the previously mentioned panel switches 26—30. The device 51 has its input terminals 52 connected to branches of the supply conductors AC1 and AC2, and has output conductors 53 which connect the input terminals of the control apparatus 50 to the supply conductors AC1 and AC2 through the conductors 52 when the switch 26 is actuated. If and when it becomes desirable to manually control the voltage impressed on the lamp one or another of the switches 27, 28, 29 and 30 of the device 51 is actuated. Thereupon current is supplied to the terminals of the lamp E' by output conductors 54 of the device 51, with a voltage difference between the conductors 54 which is selectively dependent upon which one of the different switches 27, 28, 29 and 30 is actuated. Inasmuch as control arrangements for the described purposes of the device 51 are well known, and the specific form of that device forms no part of the present invention, further description or illustration of said device is unnecessary.

As diagrammatically shown in Fig. 9, the exposure period during which the shutter J is open in printing a picture from a particular picture is controlled by control apparatus 55 in automatic response to the intensity of light received by the photoelectric tube ZD from the lamp E' through the picture G and prism ZE. In a preferred form of the present invention the control apparatus is of the type disclosed and claimed in the previously mentioned patent of Jacob Rabinowitz, No. 2,469,076. As explained in that application, different transparencies having the same average light transmitting capacities may require exposures for different periods to obtain the optimum reproduction effects with each transparency.

In accordance with the invention of the last mentioned application, each transparent picture is examined and graded as requiring a longer or shorter exposure period than a basic period which gives the optimum reproduction results for the average transparency having the same light transmitting capacity as the transparency being graded. Thus, if the basic light transmitting capacity of a particular transparency makes its basic exposure period five seconds, that particular transparency may be found to give better reproduction results if the actual exposure period is not five seconds but is seven and a half, ten, two and a half, or one and a quarter seconds and in such case switch 23, 24, 25 or 26, respectively, should be actuated. The particular exposure periods just stated are given by way of example and illustration. They depend upon the design and calibration of the control device 55, and may be varied to meet in accordance with conditions of operation. Moreover, the general operation of the printer mechanism disclosed herein may be effected by the use of other exposure period control arrangements, of which several available for use are well known.

In the arrangement shown, each exposure period is initiated by the deenergization of a relay winding 56 and the resultant movement of a movable relay contact 57 out of engagement with a stationary lower contact 58 into engagement with a stationary upper contact 59. The engagement of the contacts 57 and 59 closes an energizing circuit for the solenoid J' which is thereby actuated to move the shutter flaps J into their open position. That energizing circuit includes a branch 60 of the supply conductor AC1 to which the movable contact 57 is connected, and a connection between one terminal of the solenoid J' and the contact 58; and a connection between the second terminal of the solenoid J' and the supply conductor AC2. The solenoid J' is deenergized and the shutter flaps J are again closed when the subsequent energization of the relay winding 56 draws the contact 57 out of engagement with the contact 59. As diagrammatically shown, the energizing circuit for the winding 56 includes conductor sections 62 and 62' normally connected by a switch member 63. The latter is momentarily moved to disconnect said sections when the starting switch 21 is depressed. The return of the switch member 63 to its closed position, while necessary to the reenergization of winding 56, need not occur immediately, since the movement of the switch member 63 to its open position initiates the discharge of a previously charged condenser not shown herein, but fully disclosed in said prior application, Serial No. 594,403. Until that condenser is sufficiently discharged the winding 56 cannot be reenergized so as to terminate the exposure period.

At this point I note that in a series printing operation, the shutter is opened to print each picture after the first picture of the series, as a result of the operation of a relay 81 which as hereinafter described, opens a switch 84 normally connecting sections of the conductor 62. Also note that each of the safety switches 43, 44 and 45 when closed forms a connection between the conductors 62 and 63, which prevents the opening of the shutter by the device 55, until said switch is adjusted into its open position.

The closure of the shutter J at the end of each exposure period sets the measuring roller K into rotation to advance the strip H as required to move the section of the strip exposed while the shutter was open, out of register with the shutter orifice I and into the position for printing the identifying symbol or numeral on that section through the orifice $Z^{17}$, and to move the adjacent unexposed section of the strip H into register with the shutter orifice I for exposure when the shutter is next opened. As shown in Fig. 9, the strip feeding movement initiated when the shutter J is closed, results from the closure of the previously mentioned switch 42 by an arm $J^5$ carried by one of the shutter flaps J. On the closure of the switch 42 the solenoids $V^{10}$ and KC' are energized to permit rotation of the drive shaft T through the single revolution clutch including the part V, and the rotation of the measuring roller drive shaft KA through the gears W and W'.

As shown, each of the solenoids $V^{10}$ and KC' has one terminal connected by a conductor 64 to the supply conductor AC2, and has its second terminal connected to a conductor 65 to the upper stationary contact 66 of a relay switch. The latter comprises a movable contact 67 biased for engagement with contact 66 and connected through a conductor 68 to the switch 42 and thence through a conductor 69 to the lower contact 58 of apparatus 55. Contact 58 is normally engaged by the associated movable contact 57 which is connected to the supply conductor AC' through the conductor 60.

The energizing circuits for the solenoids $V^{10}$ and KC', established as just described, should be interrupted soon enough to prevent the drive shaft T from making more than one revolution, and to prevent the measuring roller shaft KA from making more than a half revolution. This result is accomplished with the arrangement shown in Fig. 9 by means of the switch 38 which has one terminal 70, connected to the conductor 68, and has its second terminal, 71, connected to a stationary contact 72. The latter is the lower contact of the relay switch including the previously mentioned movable contact 67. That contact engages the contact 72 when the relay winding 73 is energized. The upper end of the winding or coil 73 is connected to contact 72 and the lower end of winding 73 is connected by a conductor 74 to the branch 61 of the supply conductor AC2. With the switch 42 closed and with switch contact 57 of apparatus 55 in its normal lower position, the conductor 68 is connected through switch 42, conductor 69, stationary contact 58, and movable contact 57 to the branch 60 of the supply conductor AC'. In consequence, the closure of the switch 38 energizes the relay winding 73 which pulls movable relay contact 67 out of engagement with the upper stationary relay contact 66 and thus deenergizes the solenoids $V^{10}$ and KC'. The closure of the switch 38 is properly timed for its described purposes by locating the corresponding switch actuating projections 39 on the drum KB, so that the switch 38 will be momentarily closed during an intermediate portion of each feeding movement of the measuring roll K.

Following the completion of each half turn of the pressure roller K, one of the projections 41 engages the switch 40 and closes the latter. The closure of the switch 40 energizes the number printing lamp ZH or ZH' by closing a circuit including conductors 75, 76, 79, 80 and switch $ZH^2$. The conductor 75 connects one terminal of the switch 40 to the supply conductor AC and the conductor 76 connecting the second terminal of the switch 40 to the upper stationary contact 77 of a relay switch including a movable contact 78 biased for engagement with the contact 77. The conductor 79 and switch $ZH^2$ connects the contact 78 to one terminal of one of the lamps ZH and ZH' and the conductor 80 connects the second terminal of the lamp to the supply conductor AC2.

The lamp is deenergized after a suitable exposure period by the action of the relay device 81. The latter has one terminal 82 connected to the supply conductor AC2 and has its terminal 83 connected to the conductor 76 and thereby connected to supply conductor AC through the conductor 75 and switch 40 when the latter is closed. The relay device 81 is a socalled delay relay including provisions, which may be of well known type, for retarding its energization during the regulable period following the closure of its energization circuit needed for the proper exposure of the portion of the strip H in register with orifice $Z^{17}$. The relay 81 also gives movement to a second movable relay contact 84 to effect opening movements of the shutter J in series printing as hereinbefore described.

As previously pointed out, the selector switch 32 determines by its adjustment position at the beginning of each printing operation, whether the number of pictures printed from the picture then in the holder F is one, two or any other number up to the maximum, which, with the apparatus shown, is 15. The switch 32 determines the number of pictures printed in each series printing operation by virtue of its inclusion of a switch arm 85 and its coaction through said arm with a second rotary switch 90. The latter is journalled in a support 91 and in front of the latter carries a switch arm 92 movable counterclockwise from an initial position 0, in successive steps, one for each picture printed, through corresponding stations 1', 2', 3', 4', up to the final station, which is station 15', in the arrangement shown. The switch 90 is biased for movement in a clockwise direction, back to its initial position when displaced therefrom. The biasing means diagrammatically shown, comprises a cord or other flexible element 93 having one end secured to a drum portion 94 of the switch 90, with an adjacent portion of the cord wound around the drum. The opposite end of the cord is connected to a stationary anchorage 95 through a tension spring 96.

While each series printing operation is in progress, the switch member 92 is prevented from returning to its zero position by means of a ratchet wheel 97 secured to the switch member 90, and a locking pawl 98 pivoted to a stationary support and engaging one or another of the teeth of ratchet wheel 97. Also during the course of each multiple printing operation the ratchet wheel 97 is angularly advanced through an angular distance corresponding to the angular distance between the adjacent teeth for each feeding movement of the shaft KA, until the number of said feeding movements corresponds to the number of pictures to be printed in that printing operation. As diagrammatically shown, the ratchet wheel 97 is thus angularly advanced a tooth at a time by means of a pawl 99 pivoted to the core of a solenoid 100, and biased as by a spring 99', to engage the ratchet wheel. The solenoid 100 has one terminal connected by a conductor 101 to the supply conductor AC' and has its second terminal connected by a conductor 102 to the previously mentioned conductor 65 through normally closed relay switch contacts 103, 104. In normal operation, the solenoid 100 is temporarily energized whenever the solenoids V¹⁰ and KC' are energized, i. e., the solenoid 100 is energized once for each feeding movement of the shaft KA and measuring roller K.

During each printing operation, the feeding movements of the roller K continue until the number of such movements is equal to the number of pictures to be printed. Thereafter further feeding movements of the roller K, and further movements of the ratchet wheel 97 effected by the solenoid 100 and pawl 99 are prevented as a result of the establishment of an electric circuit including the switch arms 85 and 92. As will be apparent, the switch arm 92 will then be displaced from its neutral or zero position by a number of steps corresponding to the number of the particular station on the panel 20 with which the index 34 is then in register. The circuit, including the switch arms 85 and 92 established at the end of a series printing operation, comprises whichever of a circular series of stationary contacts 1''–15'' supported at the rear of the panel 20 is engaged by the switch arm 85 when the index 34 is in register with the corresponding position at the front of the panel. Each of the circular series of contacts 1', 2', 3'–15' carried by the switch support 91 is connected to the corresponding contact 1'', 2'', 3'', etc. by the corresponding individual conductor 105. Thus with the adjustment of the switch 85 shown in Fig. 9, the circuit established to prevent further feeding movements of the roller K includes the conductor 105, connecting contacts 3' and 3''.

The contact arm 85 of the switch 32 is connected to the supply conductor AC2 through a relay winding 106 and a conductor 107. The switch arm 92 is normally connected to the supply conductor AC2 by a circuit branch comprising a conductor 108, terminating in a contact 109, a pivoted switch member 110 engaging the contact 109 and a conductor 111. Therefore, when the switch arms 85 and 92 are connected by a conductor 105, the relay winding 106 is energized and moves the associated movable contact members 112 and 113 from their normally upper positions into engagement with stationary lower contacts 114 and 115, respectively. The contact 112 is connected by a conductor 116 to the control conductor 62' and the contact 114 is connected by a conductor 117 to the control conductor 62.

The normal printing operation cannot occur while the winding 106 is energized because the shutter J cannot be opened with the contact 112 in its lower position, and because the down movement of the contact 113 closes an energizing circuit for the solenoid F⁸ and thereby unlocks the picture holder F, and the latter cannot be relocked in place until the contact 113 moves to de-energize the solenoid F⁸.

The depression of the starting switch member 21 moves switch member 63 to its open position, also moves the switch member 110 out of engagement with the contact 109 and into engagement with a contact 120. The latter is connected by a conductor 121 to one terminal of an electro-magnetic relay 122. The latter has its second terminal connected by a conductor 123 to the supply conductor AC2. Since the switch member 110 is connected by the conductor 111 to the supply conductor AC1, its engagement with the contact 120 energizes the electromagnet relay 122. On the energization of the relay, the arms 125 and 126 of its pivoted armature 124 moves the pawls 98 and 99 out of engagement with the teeth of ratchet wheel 97. Thereupon spring 96 turns switch element 90 into its zero position in which switch arm 92 engages a stop 127. The depression of the switch member 21 which resets the switch arm 92 in its zero position, will not initiate a new picture printing operation since the picture holder F is then out of its operative position, and the armature of solenoid F⁸ holds switch 43 closed except when locking dog F⁶ enters the locking aperture F⁹ in the holder F.

The switch 47 is normally held in its closed condition by its engagement with one side edge, and the switch 48 is normally held in its open position by its engagement with the opposite side edge of a sensitized strip H being fed through the printing position of the printer. The switches 47 and 48 are associated with control mechanism to maintain the presser roller K in continuous rotation during the periods in which the "blind" or opaque leader and trailer portions H' and H² of the printing material strip H, are being wound on the take-up spool S. After the leader H' has been threaded over the guide rollers P and M, and over the feed roller K and presser roller L, and is pasted or otherwise attached to the take-up spool S, the measuring or feed roller K may be set into continuous rotation by the momentary closure of a special switch 130. The latter may well be a switch actuated by a special key, so that unauthorized actuation of the switch may be avoided. One terminal 131 of the key switch 130 is connected to the previously mentioned conductor 111, and thereby to the supply conductor AC1. The key actuation of the switch 130 connects the second terminal of the switch to a conductor 132 and thereby through a stationary relay contact 133 to one end of the relay winding 134. The other end of the winding 134 is connected by a conductor 135 to the supply conductor AC2.

The energization of the relay winding 134 pulls a movable relay contact 136 from its normal upper position into a lower position in which it engages the contact 133 and thereby closes a hold-in circuit for the relay winding 134. Said hold-in circuit includes a conductor 137 connecting the movable element of switch 47 to the relay contact 136, a switch contact 138, and a conductor 139 connected to the supply conductor AC1. In this stage of the operation, the movable member of the switch 137 is held in engagement with switch contact 138 by the adjacent edge of the leader H'.

The energization of the relay winding 134 also separates the previously mentioned relay contacts 103 and 104, and moves the contact 104 into engagement with a stationary relay contact 140, and thereby energizes the relays $V^{10}$ and KC'. Such relay energization results from the connection of the contact 140 to the conductor 111, and thereby to supply conductor AC1, and the connection of the contact 104 to the conductor 65, and thereby to one terminal of each of solenoids $V^{10}$ and KC', and the connection of the other terminals of those solenoids through conductor 64 to the supply conductor AC2. Such energization of the solenoids $V^{10}$ and KC' starts each of the shafts KA and T into rotation which is not subject to interruption by operation of the printer shutter. Furthermore, movement of the relay contact 104 out of engagement with the stationary contact 103 prevents the energization of the stepper relay 100 during this stage of operation.

The continuous rotation of the shaft KA and pressure roller K initiated as just described, continues until the advancing movement of the strip H brings the notch 141 in its side edge into register with the strip engaging portion 47' of the switch member 47. Thereupon, the switch member 47 moves into the notch 141 and out of engagement with the contact 138, and thus opens the circuit connection between the relay winding 134 and supply conductor AC1. When this occurs, the contact 104 moves out of engagement with the stationary relay contact 140 and into engagement with the contact 103, and thus interrupts the movement of the pressure roller K and makes the operation of the latter again subject to normal control by the starting switch 21 and shutter operated switch 42. Thereafter, as soon as the printer mechanism, including in particular the picture holder F, is put into its operative condition and starting switch 21 is depressed, the printer will start a new printing operation.

When subsequent feeding movements of the measuring roller K has fed substantially all of the sensitized body portion of the strip H through the printing position, a notch 142 in the edge of the strip H at the opposite side of the latter from the notch 141, is brought into register with the strip edge engaging portion 48' of the switch 48. Thereupon, the switch member 48 moves into engagement with a switch contact 143 connected by a conductor 144 to the conductor 132, and thereby to the stationary relay contact 133. The switch member 48 is connected by the conductor 145 to the conductor 137 and the movable relay contact 136. The movement of the switch part 48' into the strip notch 142 thus energizes the relay winding 134 and establishes a hold-in circuit for that winding which is maintained after the further movement of the strip has forced the switch member 48 back out of engagement with the contact 143.

The reenergization of the relay winding 134 effected by the switch 48, sets the measuring roller K into rotation which continues until the rear end of the trailer section $H^2$ moves past the edge engaging portion 47' of the switch 47. This breaks the connection between the supply conductor AC1 and the relay winding 134 and deenergizes the latter, whereupon the relay contacts 104 and 136 return to their upper positions and restore the normal control conditions.

As previously indicated, the general principles of the present invention are adapted for use in a printer in which a natural color picture is reproduced by reflected light. In such case, the picture reproduced may be a transparent negative or positive or other natural color transparency, or the picture may be opaque. In Fig. 8, I have diagrammatically illustrated a modification of the printer shown in Fig. 1, in which a picture GB to be reproduced by reflected light is supported in a holder FB which may be constructed and associated with control mechanism exactly as is the previously described holder F. It is to be expected, however, that in many cases the picture from which the reproduction will be made with the Fig. 8 printer will be larger relative to the size of the reproduction, than when the reproduction is effected by transmitting light through a transparent picture as illustrated in Fig. 1.

The projector housing BB shown in Fig. 8 differs in form from the housing B shown in Fig. 1, in that it comprises a cylindrical upper portion $B^{10}$ relatively larger in diameter than the upper end of the housing section B of Fig. 1. The main lens Z is axially disposed in the housing portion $B^{10}$, and one or more lamps EB are mounted in the annular space surrounding the lens Z to illuminate the picture. Ordinarily, a plurality of such lamps is desirable so as to insure suitably uniform illumination of the picture GB. In the arrangement illustrated, three lamps EB are spaced 120° apart about the printer axis. In Fig. 8, the photoelectric tube ZD which controls the duration of the exposure period is mounted in the outer end of a tube ZB which extends through and is supported by the housing portion $B^{10}$, and which supports at its inner end a prism ZE adjacent the lens Z as in the arrangement shown in Figs. 1 and 5. A viewing tube may also be associated with the housing portion $B^{10}$, as the viewing tube ZA is associated with the lens housing C of Figs. 1 and 5. Each of the lamps of Fig. 8 may have associated with it control tubes F and G as such control tubes are associated with the single lamp of Fig. 1. In Fig. 8, each of the tubes F and G may extend upward from the top wall of the housing section BB which is shown, as flat and directly supporting the slotted structure in which the picture holder FB is mounted.

As will be recognized, the other printer mechanism element not shown in Fig. 8 but associated with the parts therein shown, may be identical with the printer mechanism parts associated with the housing section B and printer parts supported by the latter in the printer shown in Fig. 1. Indeed, the housing part BB and mechanism supported by it, may be designed and proportioned for use interchangeably with the housing part B, and mechanism supported by the latter, shown in Fig. 1. As previously indicated, the type of apparatus shown in Fig. 8. can be used in reproducing pictures in the form of a transparent negative or positive, or other transparency, or in reproducing a natural color opaque picture, such for example, as a picture which may have been printed with the printer mechanism shown in Fig. 1 by light transmitted through a transparent picture.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. A projection printer adapted to print pictures on strip material and comprising a housing structure formed with a printing material chamber, means within said chamber for supporting a feed spool on which an elongated strip of printing material is wound, feeding mechanism within said chamber and comprising a measuring roller element rotatable to draw sections of said strip away from said feed spool, an intermittently rotatable shaft element coaxial with said measuring roller element, one of said elements being formed with a coaxial conical socket at its end adjacent the other element, and the other element having a tapered coaxial extension of the last mentioned element adapted to enter said socket and engage the peripheral wall thereof, one of said elements having a threaded coaxial portion with the element and a threaded member swiveled on the other element and adapted to enter into threaded engagement with said threaded portion when rotated in one direction and thereby force said tapered extension into driving engagement with the peripheral wall of said socket, and adapted when rotated in the other direction to axially move said elements apart.

2. A projection printer for printing pictures on successive sections of a flexible strip of sensitized material, comprising in combination a feed spool, a measuring roller which when rotated draws strip material from said spool, means for giving said roller intermittent rotative movements of predetermined magnitude, brake means adapted when actuated to positively arrest movement of said strip material away from said spool, means including a first element connected to and sharing the rotative movement of said roller and a normally stationary cooperating element for actuating said brake during a final portion of each rotative movement of said roller, and a tension device engaging the strip material between said spool and roller and yielding to permit movement under tension of the portion of the strip material extending from the feed spool to said roller during the portion of each rotative movement of the roller following the actuation of said brake.

3. A projection printer as specified in claim 2, in which said cooperating brake actuating element comprises an electrical switch arranged for engagement and actuation by said first element, for actuating said switch, and in which said brake means includes an electro-magnet energized by the actuation of said switch.

4. The combination in a projection printer for printing pictures on a sensitized strip material of feeding mechanism for said material comprising a drive shaft, means intermittently giving said shaft successive rotative feeding movements each of the same angular extent, a take-up spool, a rotatable measuring roller advancing said material in proportion to its rotative movement, yielding drive connections through which the shaft tends to rotate said spool and measuring roller continuously during each of its rotative movements, means for terminating each rotative movement of the measuring roller after the latter moves through a predetermined angle less than that which the corresponding movement of the drive shaft tends to give it.

5. A projection printer operable to successively print a predetermined plurality of pictures on sections of a strip of sensitized material successively moved into a printing position, comprising in combination an intermittently actuated strip feeding mechanism adapted on each actuation to move one section of said strip out of, and a following section into said printing position, supporting means for an image bearing transparency, means for transmitting printing light through said transparency to said printing position, means for exposing each section in said printing position to a predetermined amount of printing light, said last mentioned means including a shutter opened and closed to initiate and terminate the exposure of said section, light sensitive means responsive to the amount of light transmitted through said transparency while said shutter is open for closing the shutter at the end of each exposure period, manual means for opening the shutter to initiate the printing of a predetermined plurality of pictures, means operating automatically on each closure of the shutter to actuate said feeding mechanism, shutter opening means controlled by the feeding mechanism for opening the shutter mechanism at the end of each feeding operation and means automatically rendering said shutter opening means inoperative at the end of a predetermined number of feeding operations.

6. A projection printer operable to successively print a predetermined plurality of reproductions of a single picture on sections of a strip of sensitized material successively moved into a printing position, comprising in combination a picture holder adapted to hold a picture to be reproduced and mounted in said printer for manually actuated movement into, and biased for movement out of an operating position, locking means normally operative to maintain said holder in its operating position, intermittently actuated strip feeding mechanism adapted on each actuation to move one section of said strip out of, and a following section into said printing position, a shutter, means for projecting printing light through a picture in said picture holder to a strip section in said printing position when said shutter is open, shutter operating mechanism including light sensitive means responsive to the amount of printing light transmitted through the picture during each exposure period and operating automatically to close the shutter at the end of each exposure period, manual means for opening the shutter to initiate the printing of a plurality of reproductions, means operating automatically to actuate said feeding mechanism on each closure of the shutter, shutter opening means controlled by the feeding mechanism for automatically opening the shutter mechanism at the end of each feeding operation while said locking means is operative, means making said locking means inoperative after a predetermined number of feeding operations, and thereby making said shutter operating means inoperative.

7. A projection printer for printing pictures on successive sections of a flexible strip of sensitized material successively moved through a printing position in said printer comprising in combination, a rotatable feed spool on which sensitized material is wound, intermittently operating feeding mechanism drawing successive sections of said material away from said spool and through said printing position, a strip tensioning device over which said strip passes from said spool to said printing position and biased to a normal position in which it deflects said strip away from the path along which said feeding mechanism tends to move said material, means opposing movement of said material away from said spool, comprising a member rotating with said spool, a non-rotating member in frictional engagement with said rotating member, means pressing said members with a force regulating the tension force to which the feeding mechanism subjects the strip material in drawing the latter away from said spool and braking means actuated by said feeding means to increase the pressure between said members and positively arrest movement of the strip material away from the feed spool during the final portion of the movement of each of said material sections into said printing position, whereby as the movement of the last mentioned section into the printing position is completed the tension of the strip material is increased as required to move said tension device out of its normal position.

8. A projection printer combination as specified in claim 7 in which the braking means includes an electromagnet which when energized increases the pressure between said members, and magnet energizing means intermittently actuated by said feeding mechanism to maintain the energization of said magnet during a period in which the final portion of the movement of each of said sections into said printing position is completed and continuing after said section moves into said position.

9. A projection printer comprising a printing material chamber having a wall opening for the insertion and removal of a flanged spool on which photographic printing material in strip form with attached opaque end pieces is wound and having another wall opening, a removable light proof closure for the first mentioned opening, a shutter operable to successively expose successive sections of said material through said other opening, a pair of aligned supporting shaft sections for said spool mounted in opposing walls of said chamber with their adjacent ends spaced apart to permit said spool to be moved into and out of an operative position in which it is in axial alignment with and supported by said shaft sections, one of said sections being tubular and the other having its end adapted for centering engagement with one end of said spool, and a rod supported in the bore of said tubular shaft section and axially adjustable therein between a position in which it extends out of said tubular section into engagement with adjacent end of the spool and holds the latter in its operative position and a retracted position in which it permits the spool to be disengaged from the other shaft section and moved laterally away from its operative position.

10. An optical projection printer adapted for daylight loading and comprising a housing structure having walls enclosing a light proof printing material chamber and having an exposure orifice in one of said walls and having wall portions removable to provide normally closed wall openings, said printing chamber walls comprising a pair of opposed side walls and a top wall, and in which one of said normally closed wall openings is formed in each of said side walls and in which the means for respectively engaging and supporting said feed and take-up spools are arranged relative to said wall openings to facilitate the insertion and removal of said feed spool through the opening in one of said side walls and the insertion and removal of the take-up spool through the opening in the other of said side walls, and said top wall being formed with an opening substantially larger than said orifice, and an orifice plate in which said orifice is formed intermediate said side walls, said orifice plate being removably mounted on said top wall and closing the opening therein except for the orifice in said plate, separate adjustable feed and take-up spool supporting means within said chamber respectively arranged to releasably engage and support a feed spool and a take-up spool in respectively predetermined positions in said chamber, flanged feed and takeup spools on each of which an elongated strip of photographic material with attached opaque end portions may be wound to form a unit movable into and out of its said predetermined position in said chamber through a wall opening without damaging exposure of said material to light enveloping said unit, said structure including guide members forming a guideway in said chamber through which strip material may pass from said feed spool to said take-up spool through a printing position in register with said orifice, said guideway being accessible, when said wall portions are removed, for threading the opaque outer end portion of the material wound on a filled feed spool through said guideway and into position for attachment to an empty take-up spool preparatory to the transfer of the material from the filled feed spool to the empty take-up spool, a shutter mounted in said structure in association with said orifice and operable to open and close the latter, feeding mechanism mounted in said structure for moving said strip material from said feed spool through said guideway to said take-up spool in intermittent steps, and projecting mechanisms for projecting an image through said orifice onto strip material sections successively occupying said printing position.

LEO PAVELLE.

(References on following page)

REFERENCES CITED

The following references are of record in the file of this patent:

UNITED STATES PATENTS

| Number | Name | Date |
|---|---|---|
| 1,138,963 | Leash | May 11, 1915 |
| 1,204,098 | Watson | Nov. 7, 1916 |
| 1,325,198 | Hochstetter | Dec. 16, 1919 |
| 1,357,391 | Freytag | Nov. 2, 1920 |
| 1,363,518 | Kulus | Dec. 28, 1920 |
| 1,651,441 | Caps | Dec. 6, 1927 |
| 1,704,794 | Fritts | Mar. 12, 1929 |
| 1,729,867 | Dorn | Oct. 1, 1929 |
| 1,801,458 | Satterlee | Apr. 21, 1931 |
| 1,863,657 | Howell | June 21, 1932 |
| 1,883,884 | Doran | Oct. 25, 1932 |
| 1,909,424 | Powers | May 16, 1933 |
| 1,919,433 | Hutchings | July 25, 1933 |
| 2,371,592 | Gorey | Mar. 13, 1945 |
| 2,388,264 | Higonnet | Nov. 6, 1945 |
| 2,388,837 | Dye | Nov. 13, 1945 |
| 2,403,587 | Doyle | July 9, 1946 |
| 2,411,694 | Place | Nov. 26, 1946 |